(12) United States Patent
Qiang et al.

(10) Patent No.: US 10,873,849 B1
(45) Date of Patent: Dec. 22, 2020

(54) SYSTEM AND METHOD FOR UNIVERSAL MOBILE DEVICE LOCK USING BLOCKCHAIN

(71) Applicant: Samsung Electronics Co., Ltd., Suwon-si (KR)

(72) Inventors: Sheng Qiang, Lenexa, KS (US); Kantha Kumar Kanchiraju, Overland Park, KS (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/709,390

(22) Filed: Dec. 10, 2019

Related U.S. Application Data (60) Provisional application No. 62/863,420, filed on Jun. 19, 2019.

(51) Int. Cl.
*H04W 8/20* (2009.01)
*H04W 8/18* (2009.01)
*H04W 12/08* (2009.01)
*H04L 9/06* (2006.01)

(52) U.S. Cl.
CPC ........... *H04W 8/205* (2013.01); *H04L 9/0637* (2013.01); *H04W 8/183* (2013.01); *H04W 12/08* (2013.01); *H04L 2209/38* (2013.01)

(58) Field of Classification Search
CPC . H04W 12/0013; H04W 12/02; H04W 12/06; H04W 4/02; H04W 8/205; H04W 8/183; H04W 12/08; H04L 9/08; H04L 9/32; H04L 9/3231; H04L 9/3239; H04L 9/0637; H04L 2209/38
See application file for complete search history.

(56) References Cited

U.S. PATENT DOCUMENTS

| 8,965,339 B2 | 2/2015 | Cuadrat et al. |
| 9,813,399 B2 | 11/2017 | Velusamy |
| 2010/0140352 A1* | 6/2010 | Silverbrook ............ G06F 3/014 235/385 |

(Continued)

FOREIGN PATENT DOCUMENTS

| KR | 10-2019-058584 A | 5/2019 |
| WO | 2013048084 A2 | 4/2013 |

OTHER PUBLICATIONS

Wikipedia, "Blockchain," https://en.wikipedia.org/wiki/Blockchain, Jun. 11, 2019, 22 pages.

(Continued)

*Primary Examiner* — Diane D Mizrahi (57) ABSTRACT

A method for activating an electronic device includes receiving a request to activate the electronic device. The method also includes determining whether activation of the electronic device is permitted according to a device status record associated with the electronic device in a blockchain. In addition, the method includes one of: proceeding with the activation of the electronic device in response to determining that the activation of the electronic device is permitted according to the device status record in the blockchain and blocking the activation of the electronic device in response to determining that the activation of the electronic device is not permitted according to the device status record in the blockchain.

20 Claims, 8 Drawing Sheets

(56) References Cited

U.S. PATENT DOCUMENTS

| | | | |
|---|---|---|---|
| 2010/0219244 A1* | 9/2010 | Silverbrook | G06F 3/014 |
| | | | 235/385 |
| 2014/0237101 A1 | 8/2014 | Park | |
| 2017/0295157 A1 | 10/2017 | Chavez et al. | |
| 2019/0120929 A1* | 4/2019 | Meadow | G01S 5/10 |
| 2019/0289454 A1 | 9/2019 | Inoue | |

OTHER PUBLICATIONS

Wikipedia, "International Mobile Equipment Identity," https://en.wikipedia.org/w/index.php?title=International_Mobile_Equipment_Identity&oldid=891371135, Apr. 7, 2019, 7 pages.

Wikipedia, "SIM lock," https://en.wikipedia.org/w/index.php?title=SIM_lock&oldid=893151099, Apr. 19, 2019, 22 pages.

International Search Report and Written Opinion of the International Searching Authority in connection with International Patent Application No. PCT/KR2020/005849 dated Jul. 28, 2020, 10 pages.

\* cited by examiner

SYSTEM AND METHOD FOR UNIVERSAL MOBILE DEVICE LOCK USING BLOCKCHAIN

CROSS-REFERENCE TO RELATED APPLICATION AND PRIORITY CLAIM

This application claims priority under 35 U.S.C. § 119(e) to U.S. Provisional Patent Application No. 62/863,420 filed on Jun. 19, 2019, which is hereby incorporated by reference in its entirety.

TECHNICAL FIELD

This disclosure relates generally to communication systems. More specifically, this disclosure relates to a system and method for universal mobile device lock using blockchain.

BACKGROUND

Mobile devices, such as handsets, smartphones, tablets, and wearables, typically use a physical Subscriber Identity Module (SIM) card to gain access to a specific communication network. The SIM card contains a unique reference number that identifies the SIM card and a subscription of the SIM card. In order to authenticate a mobile device and gain access to a communications network, a mobile operator (such as a network provider or carrier) typically verifies the information on the mobile device's SIM card.

An original equipment manufacturer (OEM) may manufacture mobile devices and distribute them with SIM cards that are linked to specific mobile operators, or mobile operators may insert their own SIM cards into the mobile devices prior to sale. However, since a SIM card is often removable, the SIM card in a mobile device for one mobile operator can often be easily replaced with a SIM card for a different mobile operator. This is particularly problematic when mobile devices are sold by mobile operators with a subsidy, meaning the mobile devices are given away for free or sold at a discount. The mobile operators typically do this under an agreement that a subscriber will pay monthly for a mobile device over a given time period. Unfortunately, some subscribers will obtain mobile devices under these types of agreements, sell the mobile devices, and then break their agreements by not paying.

SUMMARY

This disclosure provides a system and method for universal mobile device lock using blockchain.

In a first embodiment, a method for activating an electronic device includes receiving a request to activate the electronic device. The method also includes determining whether activation of the electronic device is permitted according to a device status record associated with the electronic device in a blockchain. In addition, the method includes (i) proceeding with the activation of the electronic device in response to determining that the activation of the electronic device is permitted according to the device status record in the blockchain or (ii) blocking the activation of the electronic device in response to determining that the activation of the electronic device is not permitted according to the device status record in the blockchain. A non-transitory medium may contain instructions that, when executed by at least one processor of an electronic device, cause the electronic device to perform the method of the first embodiment.

In a second embodiment, an electronic device includes at least one memory and at least one processor. The at least one processor is configured to receive a request to activate the electronic device. The at least one processor is also configured to determine whether activation of the electronic device is permitted according to a device status record associated with the electronic device in a blockchain. The at least one processor is further configured to proceed with the activation of the electronic device in response to determining that the activation of the electronic device is permitted according to the device status record in the blockchain. In addition, the at least one processor is configured to block the activation of the electronic device in response to determining that the activation of the electronic device is not permitted according to the device status record in the blockchain.

In a third embodiment, a method for verifying an activation status of an electronic device includes receiving a request to activate the electronic device. The method also includes accessing a blockchain to identify a device status record associated with the electronic device in the blockchain. The method further includes determining whether activation of the electronic device is permitted according to the device status record associated with the electronic device in the blockchain. In addition, the method includes transmitting a response to the request, the response indicating whether the activation of the electronic device is permitted. An electronic device may include at least one memory and at least one processor configured to perform the method of the third embodiment. Also, a non-transitory medium may contain instructions that, when executed by at least one processor of an electronic device, cause the electronic device to perform the method of the third embodiment.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MM) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

As noted above, Subscriber Identity Module (SIM) cards are often used to authenticate mobile devices and permit access to communication networks by mobile operators. However, since a SIM card is often removable, the SIM card in a mobile device for one mobile operator can often be easily replaced with a SIM card for a different mobile operator. This is particularly problematic when mobile devices are sold by mobile operators with a subsidy, since some subscribers will obtain subsidized mobile devices, sell the mobile devices, and then break their agreements.

While various approaches have been developed to try and prevent a subsidized mobile device from being unlocked, these approaches suffer from a number of drawbacks. For example, a network lock has been used when a mobile device is subsidized at the time of purchase from a mobile operator, since the mobile operator does not want the purchaser to be able to take the mobile device to another mobile operator until the terms of a payment and subscription contract are fulfilled. However, users have found ways around network locks due the high financial motivation of unlocking mobile devices and selling them for illicit profit. For example, a practice known as "box breaking" involves purchasing a subsidized mobile device from a retail store, unlocking the device, and selling the device for a higher price than the subsidized price.

To counteract "box breaking," a mobile operator may place a SIM lock on the device, which involves applying certain restrictions on the device so that it will only work with the correct SIM card in a particular region or with a particular mobile network. A device with a SIM lock can be unlocked by entering an unlock code on the device as provided by the mobile operator or by utilizing software on the device that has the ability to unlock the device. The mobile operator can also transmit a signal with information over-the-air to unlock the device. However, a SIM lock is only enforced on the device side (not the network side), so a SIM lock can be unlocked by a different mobile operator. Also, if an unlock code is illicitly obtained, the user can unlock the device. In addition, software weaknesses may allow hackers to build around and disable restrictions put in place by a SIM lock.

Another common approach to preventing the unauthorized use of subsidized mobile devices is to log hacked devices on an International Mobile Equipment Identity (IMEI) blacklist. The IMEI blacklist is maintained by the Global System for Mobile Communications Association (GSMA) and allows mobile operators to report and check devices in blacklisted status. Unfortunately, not all operators use the blacklist database, and there is always a question of accuracy when maintaining such a database.

This disclosure provides techniques for supporting a universal device lock on a mobile device using blockchain. According to embodiments of this disclosure, blockchain technology is utilized to effectively lock a mobile device to a SIM card, such as based on region or mobile operator. Blockchain technology provides impenetrable security because it is nearly impossible to update or alter an existing record in a blockchain. This is due to the fact that blockchain technology is de-centralized and has no single point of failure. An existing blockchain record cannot be modified without directly impacting all records chained behind it, and multiple computing nodes typically have access to the blockchain. Thus, to override a device status record in a blockchain that indicates a particular mobile device is locked, a new record needs to be created and added to the blockchain to overshadow the previous record. Given the distributed nature of blockchain technology, it is unlikely someone could easily accomplish this.

Moreover, the information stored on a mobile device's SIM card and an identifier of the mobile device, such as a serial number or IMEI number, can be used to create and verify the information stored in the blockchain. For example, the SIM card contains a unique reference number that identifies a mobile operator and a subscription that accompanies the SIM card. The subscription is the contract or data plan that the user purchases from the mobile operator, otherwise known as a network provider or carrier. The mobile operator can recognize the reference number and ensure that associated costs incurred are allocated correctly according to each mobile device in its network. The SIM card also contains security information in its memory to be used during an authentication process. In order to ensure the identity of the mobile device is valid, the mobile operator often issues a challenge (such as a security question) that only the SIM card can answer. Once the SIM card is validated, access to the network can be provided to the mobile device. Mobile operators lock devices to their networks when the mobile devices are purchased with a subsidy. That is, a purchaser needs to fulfill the terms of a contract before a mobile device is unlocked. This ensures that the mobile device can only be used with one mobile operator such that the mobile operator will receive the full benefit of subsidizing the cost of the mobile device to the purchaser. Once the terms of the contract are met, the mobile operator can unlock the mobile device or SIM card, and a mobile device with an unlocked SIM card can be used with any network provider the user chooses.

In some embodiments, a device status record will be created in a blockchain using the information from a mobile device's SIM card, including a lock status. The device status record will also include an identifier of the mobile device, such as an IMEI number or serial number. Thus, a mobile operator will be provided with a high level of security corresponding to the lock status of a mobile device. A new device status record with a new lock status can only be added to the blockchain, such as by the mobile operator after the mobile operator validates the information on the mobile device's SIM card.

Also, in some embodiments, activating a mobile device requires a mobile device and a mobile operator to communicate with a blockchain platform in order to validate that the mobile device should be authenticated on the mobile operator's network. For instance, the mobile device can transmit a query to the blockchain platform with an identifier associated with the mobile device and SIM card information. The mobile device may then receive a response from the blockchain platform indicating whether activation of the mobile device is permitted based on a device status record associated with the mobile device in the blockchain. The mobile operator may also transmit another query to the blockchain platform using the mobile device identifier and SIM card information in response to an activation request received from the mobile device. The mobile operator can receive a response from the blockchain platform indicating whether activation of the mobile device is permitted based on the device status record associated with the mobile device in the blockchain. If the mobile device and the mobile operator both receive positive responses, the mobile operator can provide the mobile device with necessary information to activate the mobile device on the network. However, if one or both of the mobile operator and the mobile device do not receive positive responses from the blockchain platform, the mobile device will not be activated on the network.

In this way, the techniques described in this disclosure provide improved locking capabilities for mobile devices. Mobile operators are able to identify the lock status of a mobile device in a blockchain, and the distributed nature of the blockchain helps to prevent unauthorized parties from modifying the lock status of a device. In addition, both the mobile device and the mobile operator may access the blockchain in order to identify the lock status of a device, which helps to prevent someone from merely hacking or modifying the behavior of the device itself. Note that while often described here as involving the use of mobile devices and mobile operators, the techniques described in this disclosure may be used with any electronic device that receives communication services or other services from one or more providers. Also note that while often described here as using a removable SIM card, other information associated with an electronic device may be used here (such as an embedded SIM card or other storage device).

Figure 1:
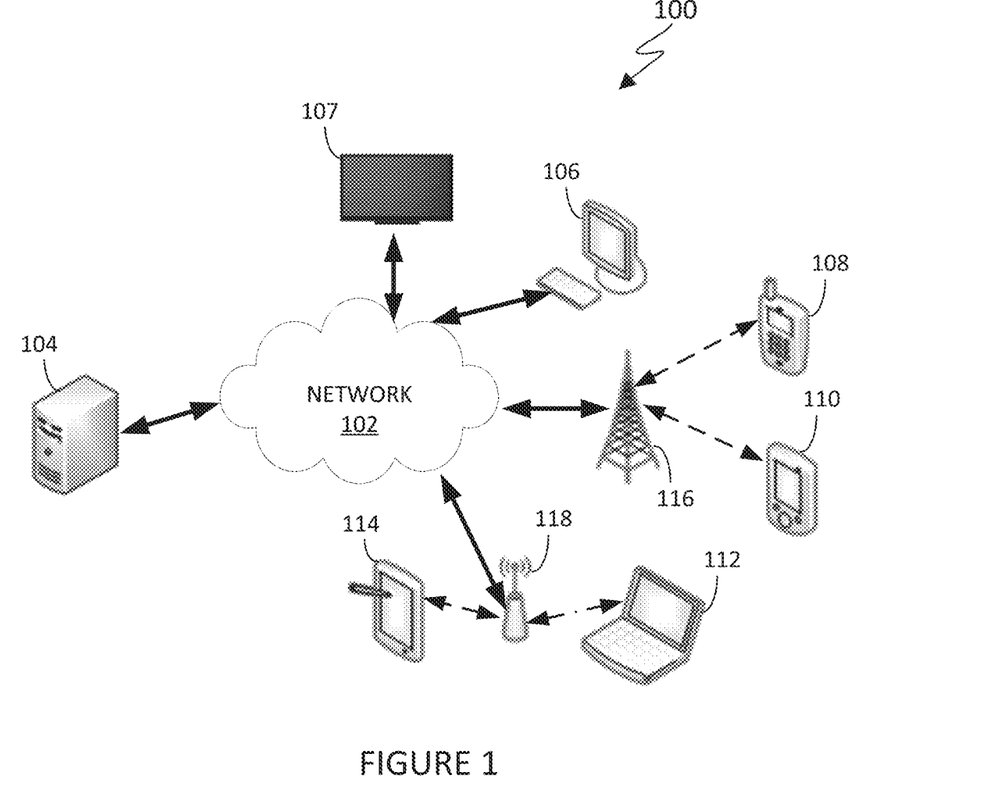
FIG. 1 illustrates an example communication system according to embodiments of this disclosure.

FIG. 1 illustrates an example communication system 100 in accordance with embodiments of this disclosure. The embodiment of the system 100 shown in FIG. 1 is for illustration only. Other embodiments of the system 100 can be used without departing from the scope of this disclosure.

The system 100 includes a network 102 that facilitates communication between various components in the system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a television (TV), a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102. In some embodiments, at least one server 104 may be associated with at least one mobile operator, and at least one other server 104 may be associated with a blockchain platform.

Each client device 106-114 represents any suitable computing or processing device that interacts with at least one server (such as the server 104) or other computing device(s) over the network 102. In this example, the client devices 106-114 include a desktop computer 106, a TV 107, a mobile telephone or mobile device 108 (such as a smartphone), a PDA 110, a laptop computer 112, and a tablet computer 114. However, any other or additional client devices could be used in the system 100. Smartphones represent a class of mobile devices 108 that are handheld devices with mobile operating systems and integrated mobile broadband cellular network connections for voice, short message service (SMS), and Internet data communications. As described in more detail below, at least one electronic device (such as any of the client device 106-114) may interact with a mobile operator and a blockchain platform.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
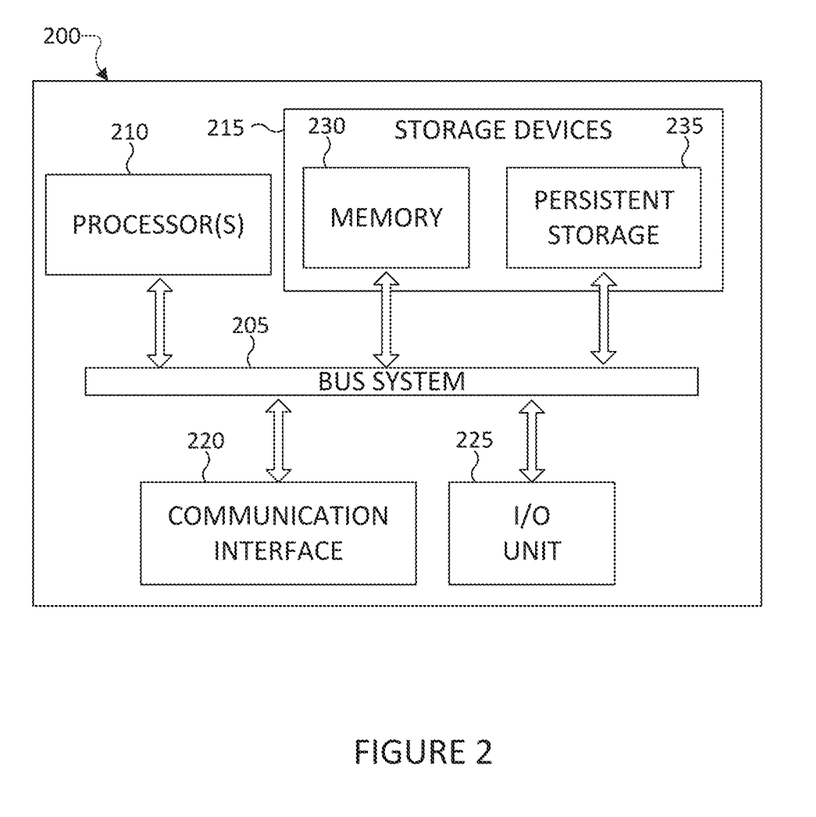
FIG. 2 illustrates an example server according to embodiments of this disclosure.

FIG. 2 illustrates an example server 200 according to embodiments of this disclosure. In some embodiments, the server 200 could represent each server 104 in FIG. 1. The server 200 can represent one or more local servers, one or more remote servers, clustered computers and components that act as a single pool of seamless resources, a cloud-based server, a neural network, and the like. The server 200 can be accessed by one or more of the client devices 106-114.

As shown in FIG. 2, the server 200 includes a bus system 205 that supports communication between at least one processing device 210, at least one storage device 215, at least one communications interface 220, and at least one input/output (I/O) unit 225. The processing device 210, such as one or more processors, executes instructions that can be stored in a memory 230. The processing device 210 can include any suitable number(s) and type(s) of processors or other devices in any suitable arrangement. Example types of the processing devices 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a RAM or any other suitable volatile or non-volatile storage device(s). The persistent storage 235 can contain one or more components or devices supporting longer-term storage of data, such as a hard drive, ROM, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

Figure 3:
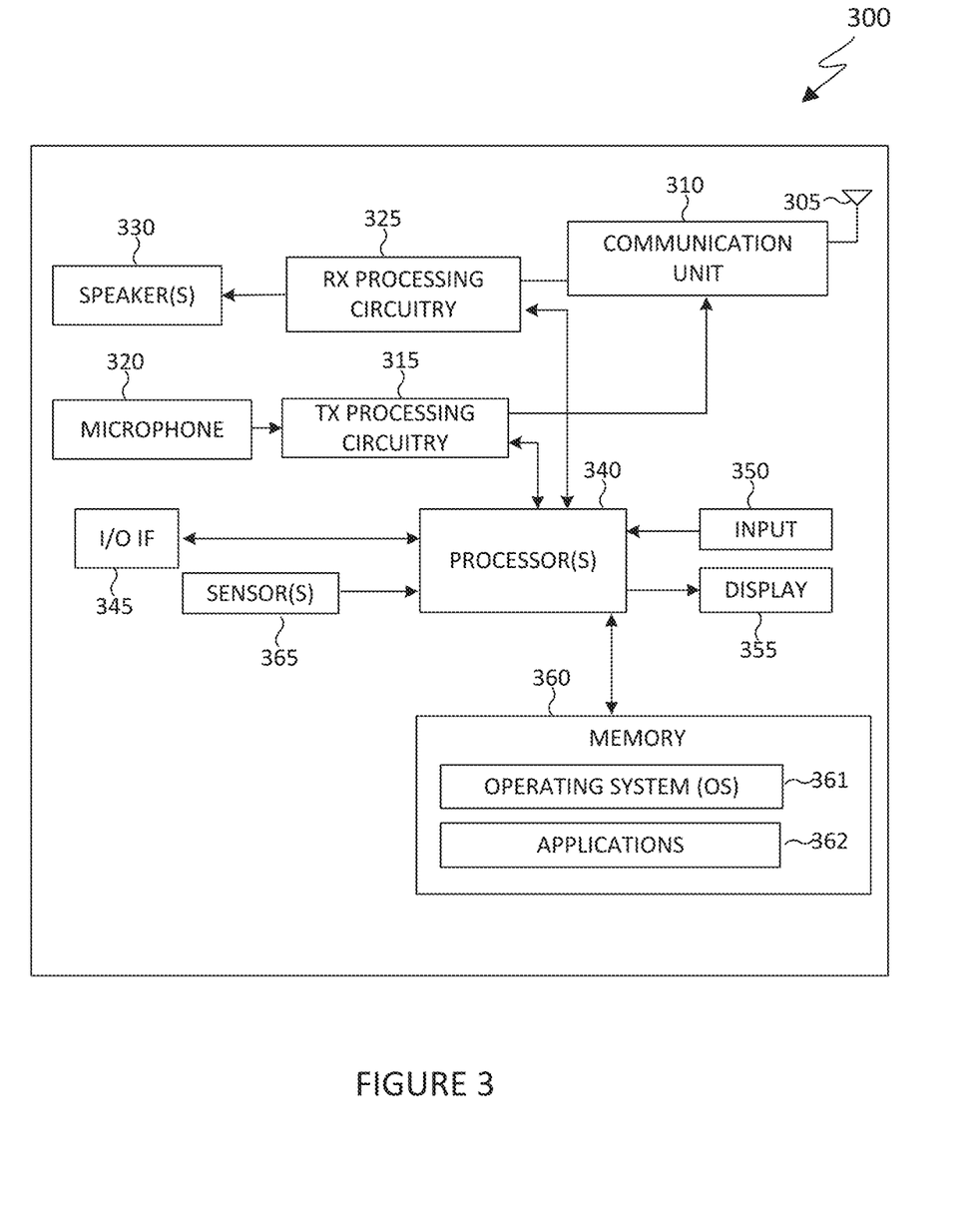
FIG. 3 illustrates an example electronic device according to embodiments of this disclosure.

FIG. 3 illustrates an example electronic device 300 according to embodiments of this disclosure. In some embodiments, the electronic device 300 could represent one or more of the client devices 106-114 in FIG. 1. The electronic device 300 can be used to access one or more servers 104, 200.

As shown in FIG. 3, the electronic device 300 includes an antenna 305, a communication unit 310, transmit (TX) processing circuitry 315, a microphone 320, and receive (RX) processing circuitry 325. The communication unit 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an I/O interface (I/O IF) 345, an input 350, a display 355, a memory 360, and a sensor(s) 365. The memory 360 includes an operating system (OS) 361 and one or more applications 362.

The communication unit 310 receives, from the antenna 305, an incoming RF signal transmitted from an access point (such as a base station, WI-FI router, or Bluetooth device) or other device of the network 102 (such as a WI-FI, Bluetooth, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in a memory 360, such as the OS 361, in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry The processor 340 is also capable of executing other processes and programs resident in the memory 360. The processor 340 can move data into or out of the memory 360 as required by an executing process. In some embodiments, the processor 340 is configured to execute a plurality of applications 362 based on the OS 361 or in response to signals received from external source(s) or an operator. Example applications 362 can include a camera application (for still images and videos), a video phone call application, an email client, a social media client, an SMS messaging client, a virtual assistant, and the like. The processor 340 is also coupled to the I/O interface 345 that provides the electronic device 300 with the ability to connect to other devices, such as client devices 104-116. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing, thereby allowing a user to input a voice command. As another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In some embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), a light emitting diode (LED) display, an organic light emitting diode (OLED) display, a quantum-dot light emitting diode (QLED) display, an active matrix OLED (AMOLED), a microelectromechanical systems (MEMS) display, or an electronic paper display. The display 355 can also be a depth-aware display, such as a multi-focal display. The display 355 is able to display, for example, various contents (such as text, images, videos, icons, or symbols) to the user. The display 355 can include a touchscreen and may receive, for example, a touch, gesture, proximity, or hovering input using an electronic pen or a body portion of the user.

The memory 360 is coupled to the processor 340. Part of the memory 360 could include a RAM, and another part of the memory 360 could include a Flash memory or other ROM. The memory 360 can include persistent storage that represents any structure(s) capable of storing and facilitating retrieval of information (such as data, program code, and/or other suitable information).

The electronic device 300 further includes one or more sensors 365 that can meter a physical quantity or detect an activation state of the electronic device 300 and convert metered or detected information into an electrical signal. For example, the sensor 365 can include one or more buttons for a touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, and the like. The sensor 365 can further include control circuits for controlling any of the sensors included therein. Any of these sensor(s) 365 can be located within the electronic device 300.

Although FIGS. 2 and 3 illustrate examples of a server 200 and an electronic device 300, various changes can be made to FIGS. 2 and 3. For example, various components in FIGS. 2 and 3 could be combined, further subdivided, rearranged, replicated, or omitted and additional components could be added according to particular needs. As a particular example, the processor 340 could be divided into multiple processors, such as one or more central processing units (CPUs) and one or more graphics processing units (GPUs). Also, as with computing and communication networks, servers and electronic devices can come in a wide variety of configurations, and FIGS. 2 and 3 do not limit this disclosure to any particular server or electronic device.

Figure 4:
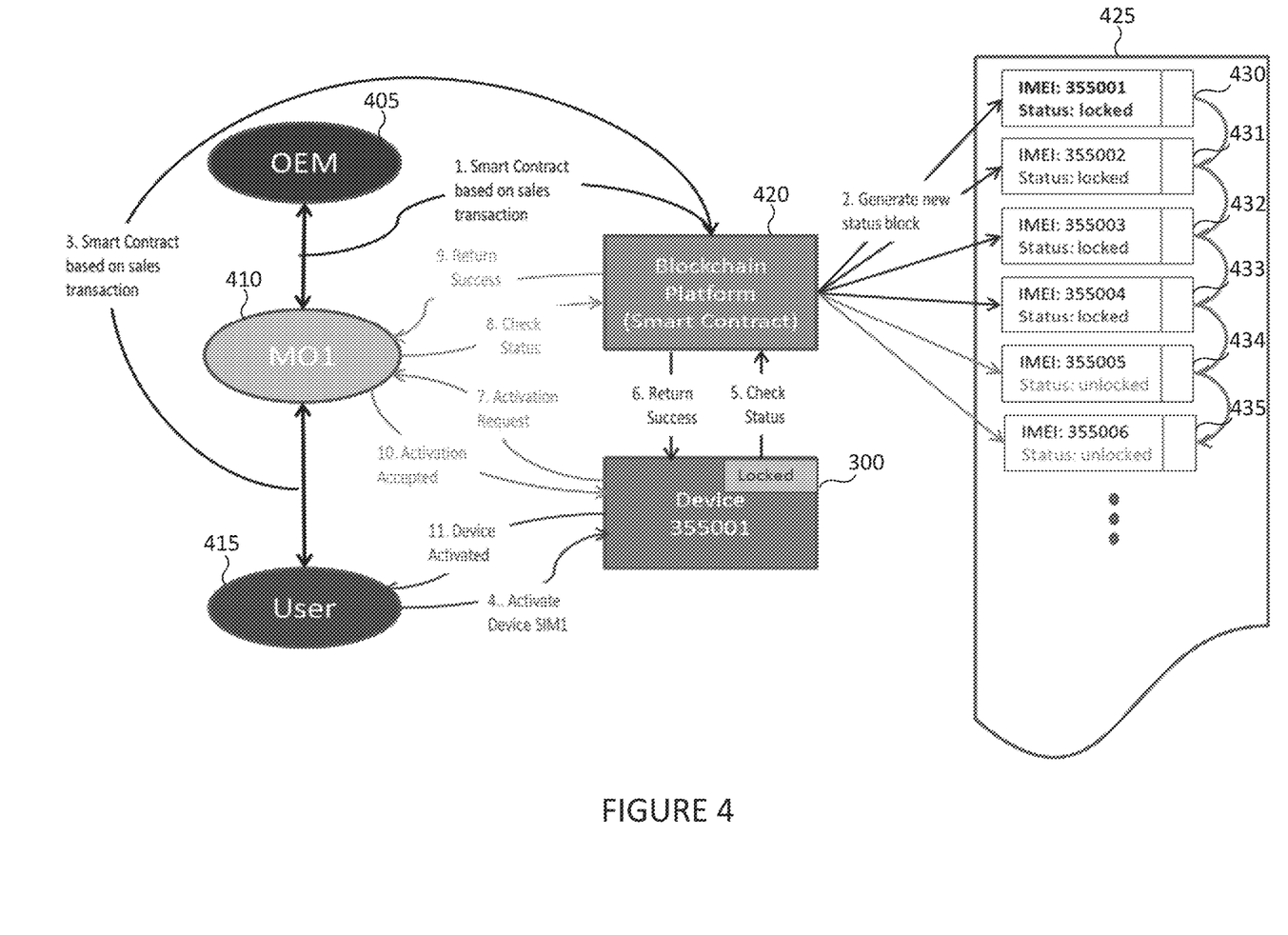
FIG. 4 illustrates an example activation process for a locked electronic device with an original Subscriber Identity Module (SIM) card according to embodiments of this disclosure.

FIG. 4 illustrates an example activation process 400 for a locked electronic device with an original SIM card according to embodiments of this disclosure. In particular, FIG. 4 illustrates an activation process 400 for activating an electronic device (such as one having a lease and subsidy) using the original SIM card. In Step 1, an original equipment manufacturer (OEM) 405 distributes an electronic device, such as an electronic device 300 of FIG. 3, to a first mobile operator (MO1) 410. A SIM card (SIM1) of the electronic device 300 is registered to the first mobile operator 410. As a particular example, the first mobile operator 410 may receive a number of electronic devices from the OEM 405 to sell or lease to end users, and each device may have a SIM card registered to the first mobile operator 410.

Based on this transaction, a new device status record 430 is added to a blockchain 425 in Step 2 for each electronic device 300. For example, when the first mobile operator 410 receives each electronic device 300, the first mobile operator 410 may provide information about the electronic device 300 to a smart contract ledger that is stored on a blockchain platform 420 (which may be implemented using one or more servers 104, 200). The information can include an identifier associated with each electronic device 300, an identifier associated with the first mobile operator 410, and a lock status of each electronic device 300. The smart contract ledger is not limited to this type of information and may receive various other information, such as information associated with each electronic device 300, each device's SIM card, the first mobile operator 410, or the first mobile operator's network. The identifier associated with each electronic device 300 can be its IMEI, serial number, or any other identifier associated with the device.

The blockchain platform 420 receives new information added to the smart contract ledger and creates device status records 430-435 corresponding to different electronic devices 300 in the blockchain 425. For example, as shown in FIG. 4, the blockchain 425 contains different device status records 430-435, each of which is associated with a different electronic device 300. In this example, each device status record 430-435 includes an identifier of the associated electronic device 300 and a lock status of that device. Other information may also be included in each device status record 430-435, such as an identifier of the mobile operator to which the associated device 300 is locked (if any). Here, the first mobile operator 410 can add transaction information regarding the devices 300 from the OEM 405 to the smart contract ledger, thereby causing the blockchain platform 420 to generate device status records 430-435 identify whether those devices 300 are locked or unlocked.

In Step 3, a user 415 enters into a sales transaction or otherwise obtains an electronic device 300 from the first mobile operator 410. The transaction may include the user 415 leasing the electronic device 300 or purchasing the electronic device 300 with a subsidy from the first mobile operator 410. This means that the user 415 is limited to using the electronic device 300 only on the network associated with the first mobile operator 410, so the first mobile operator 410 maintains a locked status of the electronic device 300. The first mobile operator 410 can add this transaction information to the smart contract ledger of the blockchain platform 420. A new device status record can be created in the blockchain 425 by the blockchain platform 420, and the new device status record can identify the device 300, the first mobile operator 410, and the locked device status. Alternatively, a new device status record may not be generated since the electronic device 300 is already associated with a device status record showing the locked status (which was created earlier by the first mobile operator 410).

In Step 4, the user 415 takes steps to activate the electronic device 300 based on the original SIM card (SIM1) that is installed in the electronic device 300. In other words, the user is attempting to activate the electronic device 300 with the first mobile operator 410 as required by the user's transaction with the first mobile operator 410. Here, the electronic device 300 shares the SIM1 card information and the identifier of the electronic device 300 with the blockchain platform 420. In Step 5, the electronic device 300 transmits a request to the blockchain platform 420 to verify that the electronic device 300 can be activated with the first mobile operator 410 based on the identifier of the electronic device 300 and the SIM1 card information. Based on the device status record 430 associated with the user's electronic device 300, the blockchain platform 420 determines that the user 415 is allowed to activate the electronic device 300 because the carrier information on the SIM1 card for the first mobile operator 410 matches the identification of the operator to which the electronic device 300 is locked in the device status record 430. The blockchain platform 420 transmits a response indicating activation is permitted to the electronic device 300 in Step 6.

In Step 7, the electronic device 300 transmits an activation request to the first mobile operator 410. The activation request includes information associated with the electronic device 300, such as the identifier of the electronic device 300 and information stored on the SIM1 card. In Step 8, the first mobile operator 410 transmits a request to the blockchain platform 420 to verify that the electronic device 300 can be activated with the first mobile operator 410 based on the identifier of the electronic device 300 and the SIM1 card information. Based on the device status record 430 associated with the user's electronic device 300, the blockchain platform 420 determines that the user 415 is allowed to activate the electronic device 300 because the carrier information on the SIM1 card for the first mobile operator 410 matches the identification of the operator to which the electronic device 300 is locked in the device status record 430. The blockchain platform 420 transmits a response indicating activation is permitted to the first mobile operator 410 in Step 9.

In Step 10, the first mobile operator 410 transmits information necessary to activate the electronic device 300. For example, the first mobile operator 410 can transmit an activation allowed message or other notification to the electronic device 300. Activation proceeds through communications between the first mobile operator 410 and the electronic device 300. In Step 11, the user 415 receives a notification that the electronic device 300 has been activated.

Although FIG. 4 illustrates one example of an activation process 400 for a locked electronic device with an original SIM card, various changes may be made to FIG. 4. For example, various steps in FIG. 4 could overlap, occur in parallel, occur in a different order, or occur any number of times. Also, while the example in FIG. 4 refers to the electronic device 300 as containing an original SIM card (SIM1), it is understood that other techniques can be used to store information on the electronic device 300 to facilitate tracking of the electronic device 300 using identifier information, carrier information, and the like.

Figure 5:
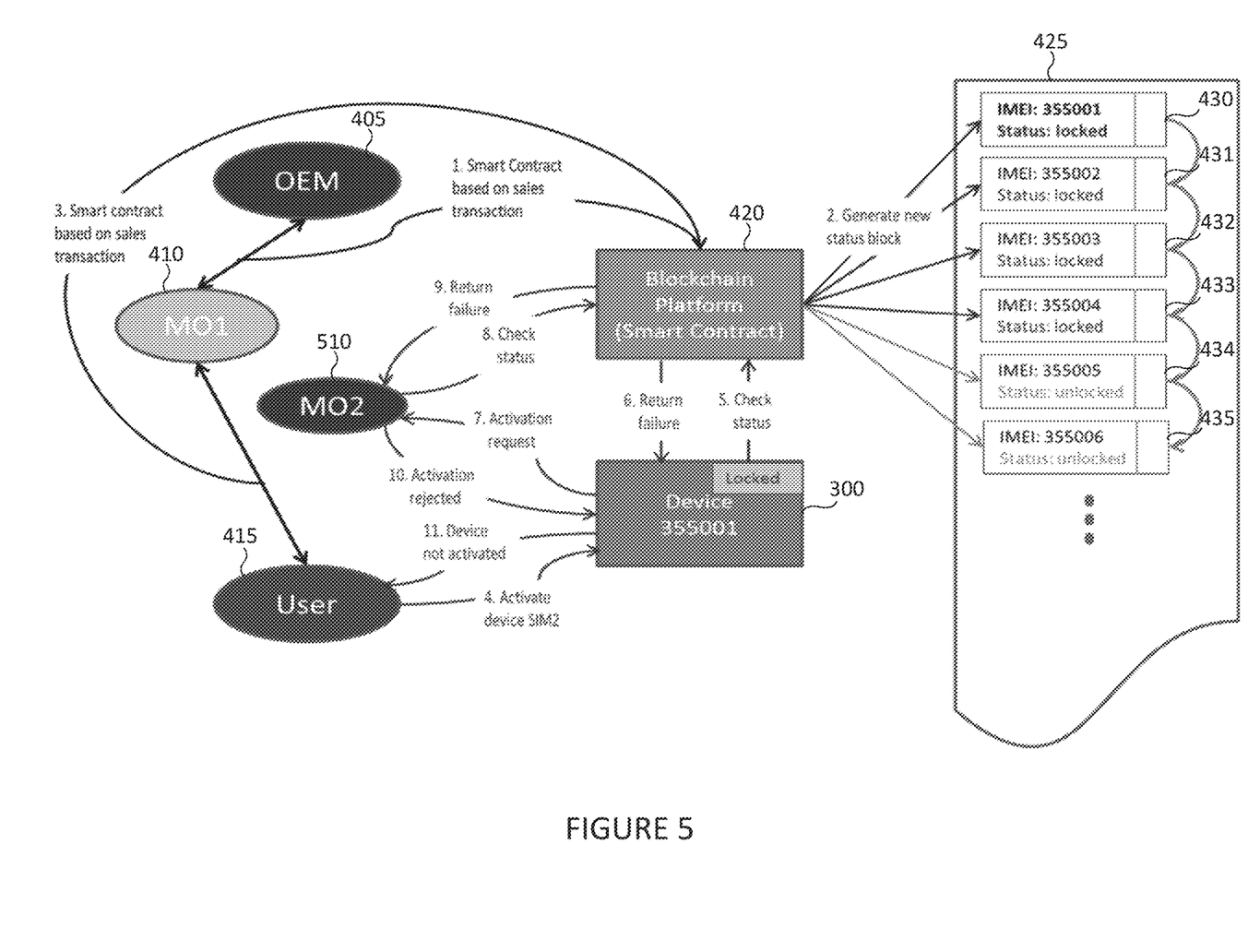
FIG. 5 illustrates an example activation process for a locked electronic device with a replacement SIM card according to embodiments of this disclosure.

FIG. 5 illustrates an example activation process 500 for a locked electronic device with a replacement SIM card according to embodiments of this disclosure. In particular, FIG. 5 illustrates an activation process 500 for attempting to activate a locked electronic device (such as one having a lease and subsidy) using a replacement SIM card (SIM2). Steps 1-4 in FIG. 5 are similar to Steps 1-4 in FIG. 4. However, the user here is attempting to activate a locked electronic device 300 with a second mobile operator (MO2) 510, likely in violation of the user's agreement or other party's agreement with the first mobile operator 410.

In Step 5, the electronic device 300 transmits a request to the blockchain platform 420 to verify that the electronic device 300 can be activated with the second mobile operator 510 based on the identifier of the electronic device 300 and the SIM2 card information. Based on the device status record 430 associated with the user's electronic device 300, the blockchain platform 420 determines that the user 415 is not allowed to activate the electronic device 300 because the carrier information on the SIM2 card for the second mobile operator 410 does not match the identification of the operator to which the electronic device 300 is locked in the device status record 430. The blockchain platform 420 transmits a response indicating activation is not permitted to the electronic device 300 in Step 6. At this point, the electronic device 300 can send an alert or notification to the user 415 that activation is not allowed.

In some embodiments, no further actions may be needed, and activation of the device 300 on the network of the second mobile operator 410 is blocked. In other embodiments, additional safeguards may be implemented to prevent the user 415 from hacking the device 300 and then attempting to activate with the second mobile operator 410 anyway. For example, in Step 7, the electronic device 300 transmits an activation request to the second mobile operator 510. The activation request includes information associated with the electronic device 300, such as the identifier of the electronic device 300 and information stored on the SIM2 card. In Step 8, the second mobile operator 510 transmits a request to the blockchain platform 420 to verify that the electronic device 300 can be activated with the second mobile operator 510 based on the identifier of the electronic device 300 and the SIM2 card information. Based on the device status record 430 associated with the user's electronic device 300, the blockchain platform 420 again determines that the user 415 is not allowed to activate the electronic device 300 because the carrier information on the SIM2 card for the second mobile operator 510 does not match the identification of the operator to which the electronic device 300 is locked in the device status record 430. The blockchain platform 420 transmits a response indicating activation is not permitted to the second mobile operator 510 in Step 9.

In Step 10, the second mobile operator 510 transmits a message to the electronic device 300 indicating that activation is not allowed. In Step 11, the user 415 receives an alert or notification that the electronic device 300 has not been activated. A message can also be provided to the user stating that activation is not allowed on the electronic device 300 because it is locked to the first mobile operator 410.

Although FIG. 5 illustrates one example of an activation process 500 for a locked electronic device with a replacement SIM card, various changes may be made to FIG. 5. For example, various steps in FIG. 5 could overlap, occur in parallel, occur in a different order, or occur any number of times. Also, while the example in FIG. 5 refers to the electronic device 300 as containing a replacement SIM card (SIM2), it is understood that other techniques can be used to store information on the electronic device 300 to facilitate tracking of the electronic device 300 using identifier information, carrier information, and the like.

Figure 6:
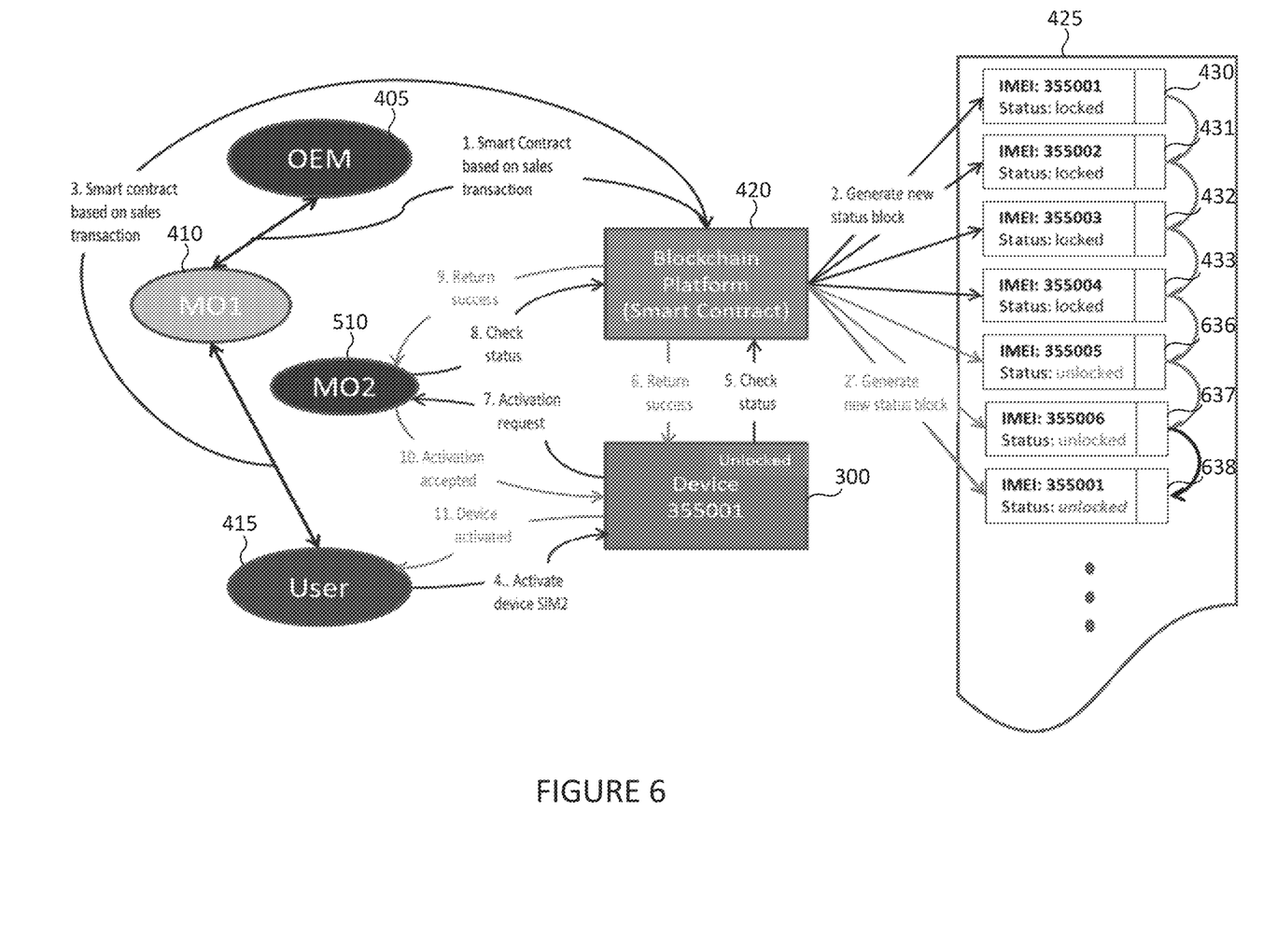
FIG. 6 illustrates an example activation process for an unlocked electronic device according to embodiments of this disclosure.

FIG. 6 illustrates an example activation process 600 for an unlocked electronic device according to embodiments of this disclosure. In particular, FIG. 6 illustrates an activation process 600 for activating an electronic device that has been unlocked (such as due to expiration of an original contract), where the device 300 originally used a SIM1 card and is now using a SIM2 card. Steps 1-3 in FIG. 6 are similar to Steps 1-3 in FIGS. 4 and 5. However, as shown here, at some point, device status records 636-638 have been created for certain electronic devices 300 indicating that those devices 300 are now unlocked.

In Step 4, the user attempts to activate the unlocked electronic device 300 with the second mobile operator 510. Unlike FIG. 5, this is not in violation of the user's agreement or other party's agreement with the first mobile operator 410. In Step 5, the electronic device 300 transmits a request to the blockchain platform 420 to verify that the electronic device 300 can be activated with the second mobile operator 510 based on the identifier of the electronic device 300 and the SIM2 card information. Based on the device status record 638 associated with the user's electronic device 300, the blockchain platform 420 determines that the user 415 is allowed to activate the electronic device 300 with the second mobile operator 510 because the device 300 is unlocked. The blockchain platform 420 transmits a response indicating activation is permitted to the electronic device 300 in Step 6.

In Step 7, the electronic device 300 transmits an activation request to the second mobile operator 510. The activation request includes information associated with the electronic device 300, such as the identifier of the electronic device 300 and information stored on the SIM2 card. In Step 8, the second mobile operator 510 transmits a request to the blockchain platform 420 to verify that the electronic device 300 can be activated with the second mobile operator 510 based on the identifier of the electronic device 300 and the SIM2 card information. Based on the device status record 638 associated with the user's electronic device 300, the blockchain platform 420 determines that the user 415 is allowed to activate the electronic device 300 with the second mobile operator 510 because the device 300 is unlocked. The blockchain platform 420 transmits a response indicating activation is permitted to the second mobile operator 510 in Step 9.

In Step 10, the second mobile operator 510 transmits information necessary to activate the electronic device 300. For example, the second mobile operator 510 can transmit an activation allowed message or other notification to the electronic device 300. Activation proceeds through communications between the second mobile operator 510 and the electronic device 300. In Step 11, the user 415 receives a notification that the electronic device 300 has been activated.

Although FIG. 6 illustrates one example of an activation process 600 for an unlocked electronic device, various changes may be made to FIG. 6. For example, various steps in FIG. 6 could overlap, occur in parallel, occur in a different order, or occur any number of times. Also, while the example in FIG. 6 refers to the electronic device 300 as containing a replacement SIM card (SIM2), it is understood that other techniques can be used to store information on the electronic device 300 to facilitate tracking of the electronic device 300 using identifier information, carrier information, and the like.

Figure 7:
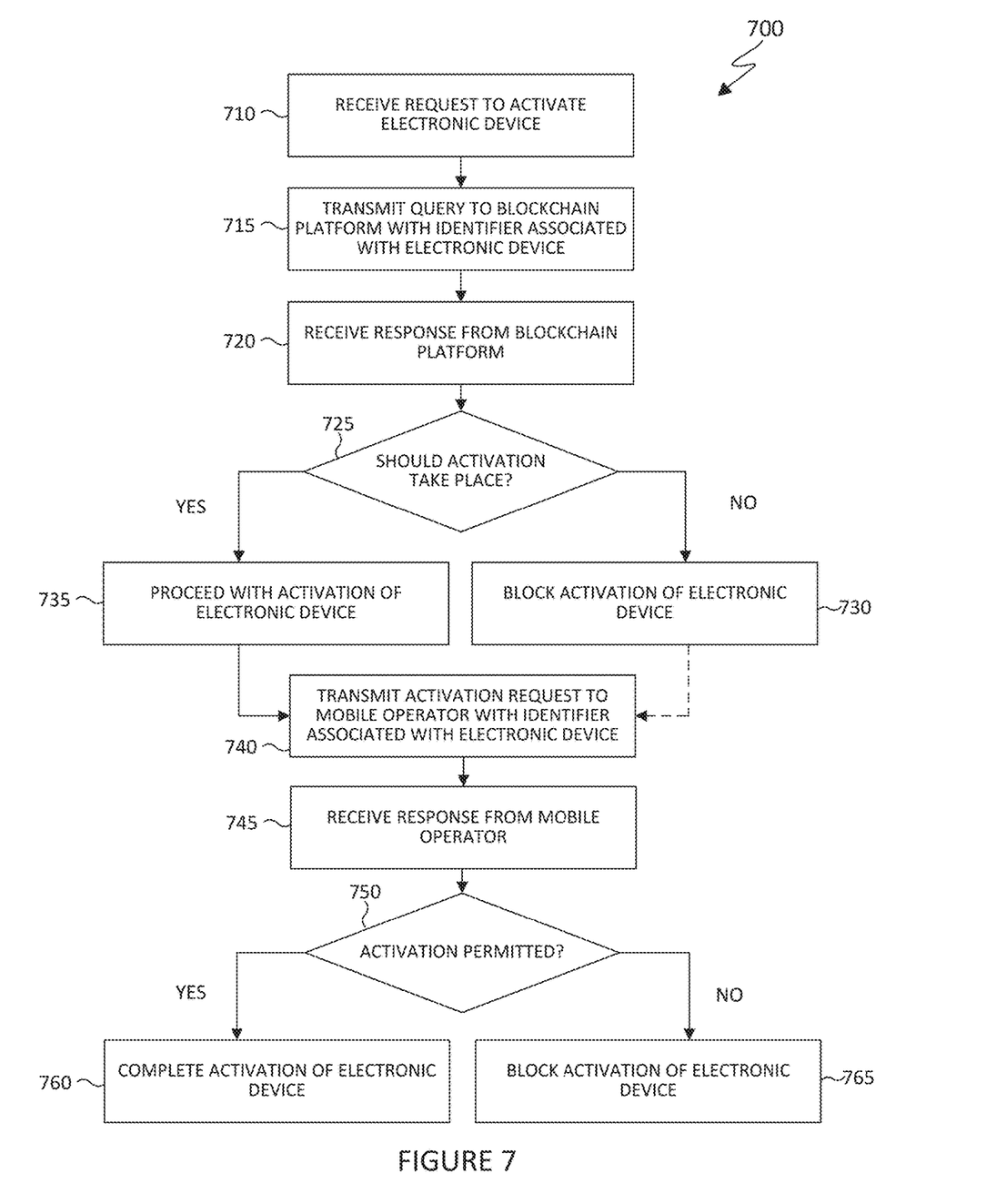
FIG. 7 illustrates an example method for activating an electronic device according to embodiments of this disclosure.

FIG. 7 illustrates an example method 700 for activating an electronic device according to embodiments of this disclosure. In particular, FIG. 7 illustrates an electronic device 300 attempting to be activated via interactions with a blockchain platform 420 and possibly a mobile operator 410, 510.

In step 710, an electronic device 300 receives a request to activate the electronic device 300. In some embodiments, a user 415 may initiate the request through one or more interactions with the electronic device 300. In step 715, the electronic device 300 transmits a query to a blockchain platform 420 to verify if activation of the electronic device 300 is allowed. The query can include information about the electronic device 300, such as an identifier associated with the electronic device 300 (like IMEI number or serial number) and information stored on a SIM card in the electronic device 300. The SIM card information can link the electronic device 300 to a specific mobile operator for network authorization. The SIM card can include other or additional information for use by the electronic device 300, such as user identity, location, phone number, security keys, personal user data, and the like. Based on the query, the blockchain platform 420 accesses the blockchain 425 and determines whether activation of the electronic device 300 should be permitted.

In step 720, the electronic device 300 receives a response from the blockchain platform 420 indicating whether activation of the electronic device 300 is permitted. In step 725, the electronic device 300 determines whether activation of the electronic device 300 is permitted based on the response from the blockchain platform 420. If not permitted, activation is blocked by the electronic device 300 in step 730. This can include notifying the user 415 that the activation is not allowed. As noted above, at this point the method 700 may end. Alternatively, the method 700 may proceed further in order help prevent hacking of the electronic device 300 and subsequent activation.

If permitted, activation of the electronic device 300 proceeds in step 735, and the electronic device 300 transmits an activation request to a mobile operator with an identifier associated with the electronic device 300 in step 740. The mobile operator 410, 510 transmits a query to the blockchain platform 420, similar to the query transmitted by the electronic device 300 in step 715, for the blockchain platform 420 to verify activation. The blockchain platform 420 transmits a response indicating whether or not the activation should proceed to the mobile operator 410, 510.

In step 745, the electronic device 300 receives a response from the mobile operator 410, 510 indicating whether the activation of the electronic device 300 is permitted based on the response that the mobile operator 410, 510 received from the blockchain platform 420. In step 750, the electronic device 300 determines whether activation is permitted based on the response from the mobile operator 410, 510. If permitted, the electronic device 300 completes the activation through communications with the mobile operator 410, 510 in step 760. If not permitted, the electronic device 300 blocks the activation in step 765. The electronic device 300 may also notify the user 415 that activation of the electronic device 300 is not allowed.

Although FIG. 7 illustrates one example of a method 700 for activating an electronic device, various changes can be made to FIG. 7. For example, while shown as a series of steps, various steps in FIG. 7 could overlap, occur in parallel, occur in a different order, or occur any number of times.

Figure 8:
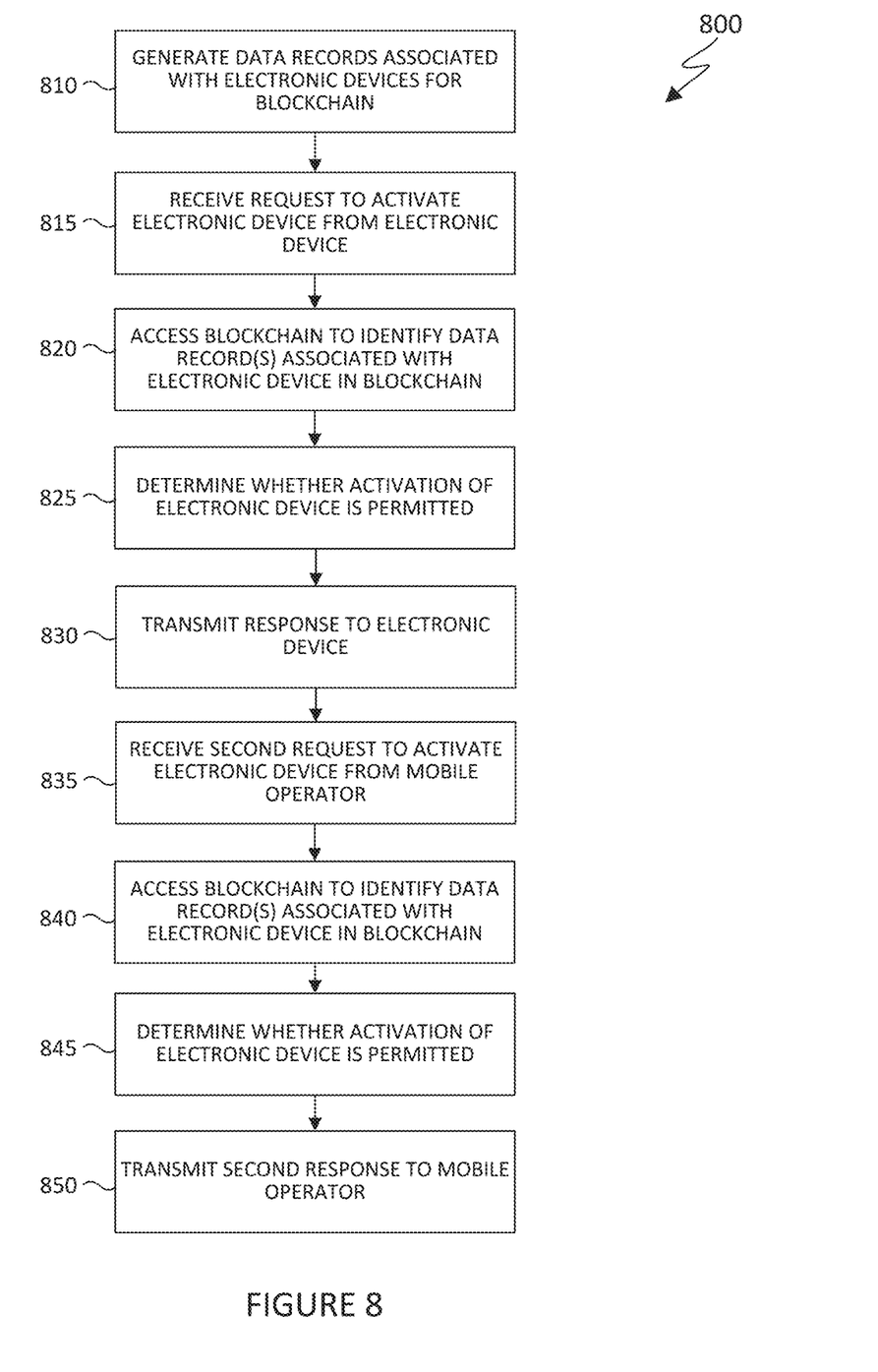
FIG. 8 illustrates an example method for verifying an activation status of an electronic device according to embodiments of this disclosure.

FIG. 8 illustrates an example method 800 for verifying an activation status of an electronic device according to embodiments of this disclosure. In particular, FIG. 8 illustrates a blockchain platform 420 verifying the activation status of an electronic device 300 by accessing at least one device status record 430-435, 636-638 in a blockchain 425.

In step 810, the blockchain platform 420 generates device status records 430-435, 636-638 for the blockchain 425. The device status records 430-435, 636-638 can be based on transactions between the OEM 405 and the mobile operators 410, 510 and/or transactions between the mobile operators 410, 510 and various users 415. The device status records 430-435, 636-638 contain information associated with various electronic devices 300 and the associated mobile operators 410,510, such as an identifier of each electronic device 300, an identifier of the associated mobile operator 410, 510, and a lock status. The device status records 430-435, 636-638 can also be based on other transactions and other information associated with the electronic devices 300.

In step 815, the blockchain platform 420 receives a request to activate a specific electronic device 300 from that electronic device 300. As part of the request, the electronic device 300 may transmit an identifier of the electronic device 300 and SIM card information to the blockchain platform 420. In some embodiments, the SIM card information includes an identifier of a mobile operator 410, 510. In step 820, the blockchain platform 420 accesses the blockchain 425 to identify at least one device status record associated with the electronic device 300. In step 825, the blockchain platform 420 determines whether activation of the electronic device 300 is permitted based on the identified device status record(s). For example, if the device status record associated with the electronic device 300 indicates that the status is unlocked or that the status is locked but confirms that the mobile operator 410, 510 is correct, the blockchain platform 420 can determine that activation is permitted. If the device status record associated with the electronic device 300 indicates that the status is locked and that the mobile operator 410, 510 is not correct, the blockchain platform 420 can determine that activation is not permitted. In step 830, the blockchain platform 420 transmits a response to the electronic device 300 indicating whether or not activation is allowed. In some cases, the method 800 may end here if activation is not allowed. In other cases, the method 800 may proceed to step 835.

In step 835, the blockchain platform 420 receives a second request to activate the specific electronic device 300 from a mobile operator 410, 510. As part of the request, the mobile operator 410, 510 may transmit an identifier of the electronic device 300 and SIM card information to the blockchain platform 420. In some embodiments, the SIM card information includes an identifier of the mobile operator 410, 510. In step 840, the blockchain platform 420 accesses the blockchain 425 to identify at least one device status record associated with the electronic device 300. In step 845, the blockchain platform 420 determines whether activation of the electronic device 300 is permitted based on the identified device status record(s). This can occur in the same or similar manner as step 825. In step 850, the blockchain platform 420 transmits a response to the mobile operator 410, 510 indicating whether or not activation is allowed.

Although FIG. 8 illustrates one example of a method 800 for verifying an activation status of an electronic device, various changes can be made to FIG. 8. For example, while shown as a series of steps, various steps in FIG. 8 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method for activating an electronic device, the method comprising:
   receiving a request to activate the electronic device;
   determining whether activation of the electronic device to access a mobile operator network is permitted according to a device status record associated with the electronic device in a blockchain; and
   one of:
      proceeding with the activation of the electronic device in response to determining that the activation of the electronic device is permitted according to the device status record in the blockchain; or
      blocking the activation of the electronic device in response to determining that the activation of the electronic device is not permitted according to the device status record in the blockchain.

2. The method of claim 1, wherein determining whether the activation of the electronic device is permitted comprises:
   transmitting a query to a blockchain platform with an identifier associated with the electronic device; and
   receiving a response from the blockchain platform indicating whether the activation of the electronic device is permitted based on the device status record, the device status record associated with the identifier.

3. The method of claim 1, further comprising:
   determining whether the activation of the electronic device is permitted according to a mobile operator; and
   one of:
      activating the electronic device in response to determining that the activation of the electronic device is permitted according to the mobile operator, or
      blocking the activation of the electronic device in response to determining that the activation of the electronic device is not permitted according to the mobile operator.

4. The method of claim 1, wherein the device status record associated with the electronic device in the blockchain comprises a device status record indicating whether the electronic device is locked to a specific carrier or is unlocked.

5. The method of claim 4, wherein the device status record comprises an electronic device identifier, a mobile operator identifier, and a lock status.

6. The method of claim 4, wherein the device status record is based on a transaction between an original equipment manufacturer and a mobile operator.

7. The method of claim 4, wherein the device status record is based on a transaction between a mobile operator and a user.

8. An electronic device comprising:
   at least one memory; and
   at least one processor operatively connected to the at least one memory and configured to:

receive a request to activate the electronic device;

determine whether activation of the electronic device to access a mobile operator network is permitted according to a device status record associated with the electronic device in a blockchain;

proceed with the activation of the electronic device in response to determining that the activation of the electronic device is permitted according to the device status record in the blockchain; and block the activation of the electronic device in response to determining that the activation of the electronic device is not permitted according to the device status record in the blockchain.

9. The electronic device of claim 8, wherein, to determine whether the activation of the electronic device is permitted, the at least one processor is configured to:

transmit a query to a blockchain platform with an identifier associated with the electronic device; and receive a response from the blockchain platform indicating whether the activation of the electronic device is permitted based on the device status record, the device status record associated with the identifier.

10. The electronic device of claim 8, wherein the at least one processor is further configured to:

determine whether the activation of the electronic device is permitted according to a mobile operator;

activate the electronic device in response to determining that the activation of the electronic device is permitted according to the mobile operator; and block the activation of the electronic device in response to determining that the activation of the electronic device is not permitted according to the mobile operator.

11. The electronic device of claim 8, wherein the device status record associated with the electronic device in the blockchain comprises a device status record indicating whether the electronic device is locked to a specific carrier or is unlocked.

12. The electronic device of claim 11, wherein the device status record comprises an electronic device identifier, a mobile operator identifier, and a lock status.

13. The electronic device of claim 11, wherein the device status record is based on a transaction between an original equipment manufacturer and a mobile operator.

14. The electronic device of claim 11, wherein the device status record is based on a transaction between a mobile operator and a user.

15. A method for verifying an activation status of an electronic device, the method comprising:

receiving a request to activate the electronic device;

accessing a blockchain to identify a device status record associated with the electronic device in the blockchain;

determining whether activation of the electronic device to access a mobile operator network is permitted according to the device status record associated with the electronic device in the blockchain; and transmitting a response to the request, the response indicating whether the activation of the electronic device is permitted.

16. The method of claim 15, further comprising:

receiving a second request to activate the electronic device from a mobile operator;

determining whether activation of the electronic device is permitted; and transmitting a second response to the mobile operator, the second response indicating whether the activation of the electronic device is permitted.

17. The method of claim 15, further comprising:

generating device status records for the blockchain, the device status records based on transactions between original equipment manufacturers and mobile operators and based on transactions between the mobile operators and users.

18. The method of claim 15, wherein the device status record associated with the electronic device in the blockchain comprises a device status record indicating whether the electronic device is locked to a specific carrier or is unlocked.

19. The method of claim 18, wherein the device status record comprises an electronic device identifier, a mobile operator identifier, and a lock status.

20. The method of claim 18, wherein the device status record is based on a transaction between an original equipment manufacturer and a mobile operator.

* * * * *